UNITED STATES PATENT OFFICE.

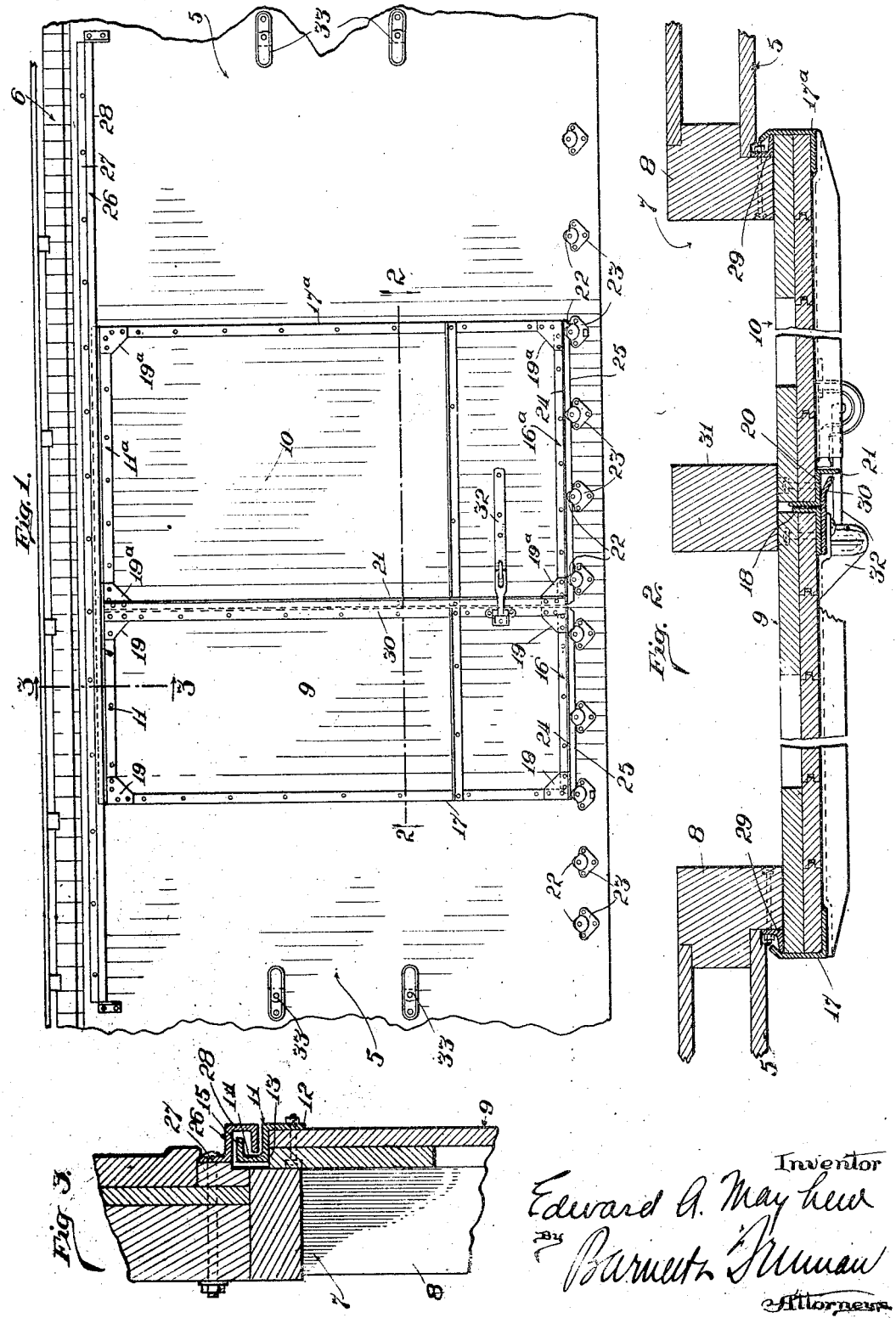

EDWARD A. MAYHEW, OF CHICAGO, ILLINOIS, ASSIGNOR TO UNION METAL PRODUCTS COMPANY, OF CHICAGO, ILLINOIS, A CORPORATION OF ILLINOIS.

CAR-DOOR.

1,374,461.

Specification of Letters Patent.

Patented Apr. 12, 1921.

Application filed May 9, 1919. Serial No. 295,962.

*To all whom it may concern:*

Be it known that I, EDWARD A. MAYHEW, a citizen of the United States, residing at Chicago, in the county of Cook and the State of Illinois, have invented certain new and useful Improvements in Car-Doors, of which the following is a specification.

My invention relates to railway box car doors of the double sliding, outside type such as are used on automobile and furniture cars.

The object of my invention is to provide a double door of the type mentioned which will be of strong and durable construction and waterproof around the outer edges and at the meeting edges. My invention contemplates providing a door made in two sections, each section comprising an angle iron frame work and a panel, which may be of wood or metal, the outer edges being provided with weather strips adapted to slide under suitable vertical strips fastened at the respective sides of the door opening to the side of the car and the meeting edges being provided with a weather strip which is secured to one of the door sections and adapted to guide the meeting edges together and to cover the crack between them, the other section having a baffle which will effectively coöperate with the weather strip and prevent the entrance of rain or snow.

The invention consists in the novel and improved constructions, arrangements and devices to be hereinafter described and claimed for carrying out the above stated object and such other incidental objects as will appear from the following description.

The invention is illustrated, in a preferred embodiment, in the accompanying drawings, wherein—

Figure 1 is a fragmentary side elevational view of a car provided with a door embodying the principles of my invention; and Figs. 2 and 3 are enlarged sectional views taken on the respective lines 2—2 and 3—3 of Fig. 1.

Like characters of reference designate like parts in the several figures of the drawing.

The car as shown in the drawing is of ordinary construction and is provided with the side sheathing 5 and the roof 6, the side wall being formed with a door opening 7. The door opening is provided on each side with the door posts 8—8 against which the door sections bear and over which they slide in opening and closing.

The door comprises the sections 9 and 10 which may be of equal width although preferably one section is somewhat narrower in width than the other so that when only a small opening is required the narrower and lighter section may be opened. The metal portion of the narrower door section 9 comprises four metal strips, angular in cross section, which are arranged along the edges of the section as follows: At the upper edge of the door section is a Z-bar 11 having a vertical depending flange 12 overlapping the panel portion of the section, an inturned horizontal flange 13, and an upwardly projecting vertical flange 14 which is bent over outwardly to provide a lip 15. A Z-bar 16 is secured to the lower edge of the door section. On the outer edge of the door section is secured a channel bar 17, of which the outer flange laps over the panel portion of the door and the inner flange projects forwardly and inwardly. On the meeting or forward edge of the door is secured an angle bar 18. The metal structure thus formed is preferably reinforced by corner gusset plates 19. The other door section is constructed in a similar manner, except the meeting edge, and the corresponding angle bars have been given the same reference characters with the exponents $a$. The meeting edge of the door section 10, instead of being provided with an ordinary angle iron, is provided with a Z-bar 20, the flange 21 of which projects outwardly at right angles from the face of the door section and forms a weather proofing or baffle member.

The door sections are preferably supported on a plurality of rollers 22 mounted in the brackets 23 secured to the side of the car below the door opening, the rollers being engaged by the horizontal flange 24 and the depending vertical flange 25 of the Z-bar 16. Above the door opening a guiding and weatherproofing strip 26 is provided having a flange 27 secured to the side sheathing of the car, and a horizontally disposed channeled portion 28 which extends around the out-turned lips formed on the Z-bars 11 and 11[a] provided on the upper edges of the respective door sections.

The door posts 8 are each provided with a vertical cleat 29 extending from top to bottom of the post, preferably in the form of an angle bar, the outwardly extending flange of which is adapted to fit under the inwardly and forwardly projecting flange of the channel bar 17, the term "forward" having reference to the direction in which the door sections are moved to close the door. The meeting edge of the door section 9 is provided with a weatherproofing strip 30 which is bolted to the door section over the outer flange of the angle bar 18. The free edge of the strip 30 projects over the meeting edge of the other door section when the door is closed and is bent outwardly so as to guide the meeting edges of the sections together. When the sections are in closed position the flange 21 of the Z-bar 20 comes close to the free edge of the strip 30; this arrangement preventing rain, snow, dust and cinders from entering the car through any crack or space that may exist between the meeting edges of the door sections.

A movable door jamb member 31 may be provided to give support to the forward edges of the door sections; no claim, however, being made to such member herein as the combination of such member with the other elements of the door construction is claimed in a co-pending application filed by me January 12th, 1920, Serial No. 350,823. The door sections are held together by means of the locking mechanism 32. Stops 33 may be provided on the side of the car to limit the movement of the door sections when the door is opened.

I claim:

1. In combination with a railway box car having a door opening and a pair of sliding door sections to close said opening, of a combined weather strip and guiding member fastened to the meeting edge of one of said sections, having its free edge projecting toward the other section and bent outwardly to form a guide for the meeting edge of the other section, so as to insure proper alinement of said sections, and a baffle member fastened to said second mentioned section adjacent its meeting edge, and adapted in coöperation with the weather strip and guiding member to prevent rain and the like from entering the car between the meeting edges of the door sections.

2. In combination with a railway box car having a door opening and a pair of sliding door sections to close said opening, one of said sections having an angle iron over its meeting edge and the other section having a Z-bar over its meeting edge, of a combined weather strip and guiding member fastened over the face side of said angle iron to said first mentioned section and having its free edge projecting toward the other section and bent outwardly to form a guide for the meeting edge of the other section, one flange of said Z-bar projecting out at right angles from the face of the second mentioned section to a point beyond the outer surface of said weather strip and guiding member and serving as a baffle member and adapted in coöperation with the weather strip and guiding member to prevent rain and the like from entering the car between the meeting edges of the door sections.

3. The combination with the super-structure of a railway box car having a door opening, of a pair of sliding door sections mounted on the side of the car and adapted to close said opening, each section comprising a rectangular frame of angle iron construction and a panel, a weather strip and guiding member fastened to the meeting edge of one of said sections having its free edge projecting toward the other section and bent outwardly to form an inclined guiding surface to engage the meeting edge of the other section to insure the alinement of said sections, and a baffle member projecting from the angle iron on the meeting edge of the second mentioned section and adapted in coöperation with the weather strip and guiding member to prevent rain and the like from entering the car between the meeting edges of the door sections.

4. The combination with the super-structure of a railway box car having a door opening, of a pair of sliding door sections mounted on the side of the car and adapted to close said opening, each section comprising a rectangular frame of angle iron construction and a panel, the outer edges of said sections having inwardly projecting strips adapted to slide under vertical members fastened to the car at the respective sides of the door opening, and a weather strip and guiding member fastened to the meeting edge of one of said sections and having its free edge projecting toward the other section and bent outwardly to form a guide having a tapered inner surface for engaging the meeting edge of the other section, so as to bring said door sections into alinement with each other, and a baffle projecting from the angle iron on the meeting edge of the second mentioned section and adapted in coöperation with the weather strip and guiding member to prevent rain and the like from entering the car between the meeting edges of the door sections.

5. The combination with the super-structure of a railway box car having a door opening, of a pair of sliding door sections mounted on the side of the car and adapted to close said opening, each section comprising a rectangular frame and a panel, said frames each comprising top, bottom and side members, said top members being adapted to hook over an inwardly projecting flange formed on a horizontal member fastened to the side of the car above the door opening, said bottom member being adapted to bear against a plurality of rollers mounted on the outside of the car below the door opening, the outer side frame members being adapted to slide under vertical cleats fastened to the car at the respective sides of the door opening, one of said sections having an angle iron over its meeting edge and the other section having a Z-bar over its meeting edge, and a combined weather strip and guiding member fastened over the outer flange of said angle iron to said first mentioned section and having its free edge projecting toward the other section and bent outwardly to form a guide having an inclined surface for engaging the meeting edge of the other section to insure alinement of said sections, one flange of said Z-bar projecting out at right angles from the face of the second mentioned section and serving as a baffle member and adapted in coöperation with the weather strip and guiding member to prevent rain and the like from entering the car between the meeting edges of the door.

EDWARD A. MAYHEW.